(12) United States Patent
Lan et al.

(10) Patent No.: US 8,478,263 B1
(45) Date of Patent: Jul. 2, 2013

(54) SYSTEM AND METHOD FOR DETERMINING WIRELESS CHIPSET PERFORMANCE

(75) Inventors: Wei-Ming Lan, Morrisville, NC (US); Abhinay Sinai Talaulicar, Herndon, VA (US)

(73) Assignee: Clearwire IP Holdings LLC, Bellevue, WA (US)

( * ) Notice: Subject to any disclaimer, the term of this patent is extended or adjusted under 35 U.S.C. 154(b) by 964 days.

(21) Appl. No.: 12/099,866

(22) Filed: Apr. 9, 2008

(51) Int. Cl.
*H04W 24/00* (2009.01)

(52) U.S. Cl.
USPC ........... 455/423; 455/425; 455/115.2; 703/13

(58) Field of Classification Search
USPC ... 370/248–252; 375/145, 267, 300; 455/115, 455/423, 561, 67.11; 703/13
See application file for complete search history.

(56) References Cited

U.S. PATENT DOCUMENTS

| | | | | |
|---|---|---|---|---|
| 7,039,098 | B2* | 5/2006 | Younis | 375/149 |
| 7,154,959 | B2* | 12/2006 | Erceg et al. | 375/267 |
| 7,596,355 | B2* | 9/2009 | Li et al. | 455/69 |
| 7,620,368 | B2* | 11/2009 | Wang et al. | 455/67.11 |
| 7,809,404 | B2* | 10/2010 | Daniels et al. | 455/562.1 |
| 7,817,566 | B2* | 10/2010 | Lee et al. | 370/248 |
| 2005/0215208 | A1* | 9/2005 | Stoddard et al. | 455/115.2 |
| 2007/0099606 | A1* | 5/2007 | Strohlein et al. | 455/423 |
| 2008/0114580 | A1* | 5/2008 | Chin et al. | 703/13 |
| 2009/0213955 | A1* | 8/2009 | Higuchi et al. | 375/267 |

OTHER PUBLICATIONS

ACE™ 400WB Channel Emulator for WiMAX, http://web.archive.org/web/20070509170613/http://www.azimuthsystems.com/platforms-channel-400wb.htm, May 9, 2007.*
Azimuth Systems, Inc., "Azimuth Director II Test Executive Software," www.azimuthsystems.com, 2007, 3 pages, Acton, Massachusetts, http://www.azimuthsystems.com/software-director_ii.htm.
Azimuth Systems, Inc., "Wi-Fi Certification," www.azimuthsystems.com, 2007, 3 pages, Acton, Massachusetts, http://www.azimuthsystems.com/solutions-wi-fi-certification.htm.
Azimuth Sytems, Inc., "ACE 400WB WiMAX 4×4 MIMO Bi-Directional Channel Emulator," www.azimuthsystems.com, 2007, 4 pages, Acton, Massachusetts, http://www.azimuthsystems.com/Collateral/Documents/Common/PB_ACE400wb_v4_0807_sql.pdf.

* cited by examiner

*Primary Examiner* — Kashif Siddiqui
(74) *Attorney, Agent, or Firm* — O'Brien Jones, PLLC

(57) ABSTRACT

A performance indicator for uplink traffic is measured a plurality of times under a plurality of conditions to generate a set of uplink performance indicators. The performance indicator for downlink traffic is measured a plurality of times under the plurality of conditions to generate a set of downlink performance indicators. The performance indicator for bidirectional traffic is measured a plurality of times under the plurality of conditions to generate a set of bidirectional performance indicators. The plurality of conditions comprise: a set of center frequency parameters; a set of attenuation factor parameters for each one of the set of center frequency parameters; a set of channel model parameters for each one of the combinations of attenuation factor parameters and center frequency parameters; and, a set of modulation coding scheme parameters for each one of the combinations of channel model parameters, attenuation factor parameters, and center frequency parameters.

19 Claims, 6 Drawing Sheets

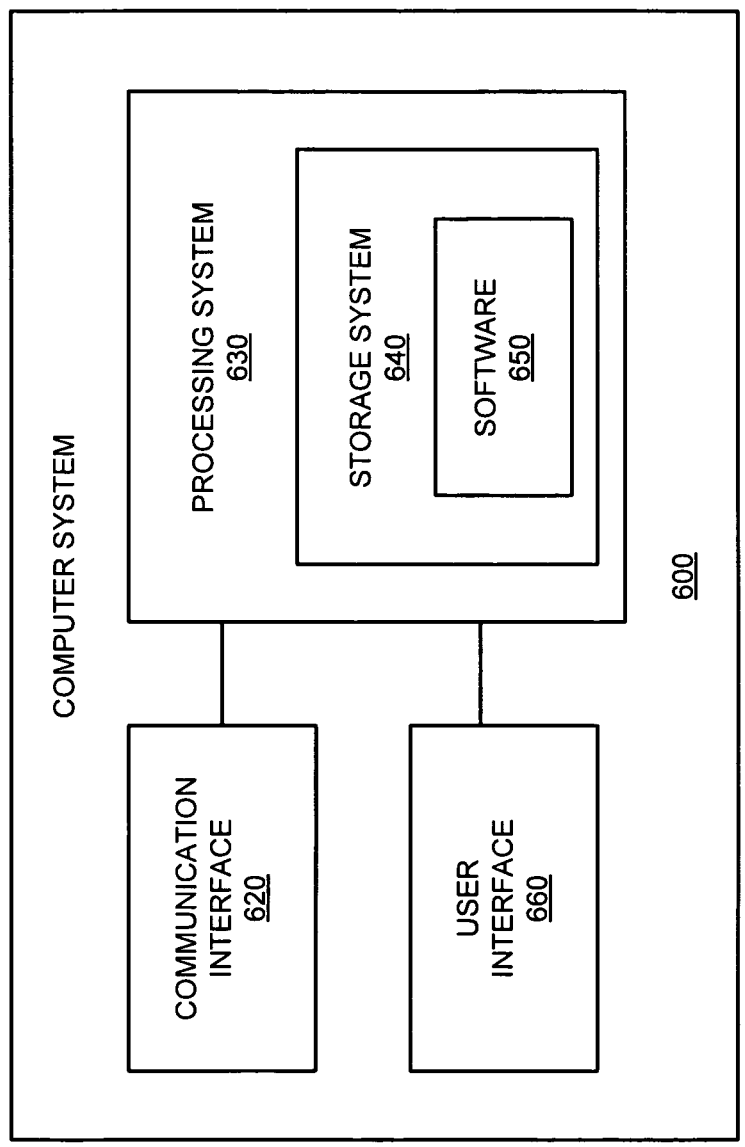

SYSTEM AND METHOD FOR DETERMINING WIRELESS CHIPSET PERFORMANCE

TECHNICAL BACKGROUND

Wireless communication may be used as a means of accessing a communication network and has certain advantages over wired communications for accessing a communication network. One of those advantages is a low cost of infrastructure to provide access to many separate mobile devices. To use wireless communication to access a network, a customer device needs to have at least one transceiver in active communication with another transceiver that is connected to the network.

To facilitate wireless communication, the Institute of Electrical and Electronics Engineers (IEEE) has promulgated a number of wireless standards. These include the 802.11 (WiFi) standards and the 802.16 (WiMax) standards Likewise, the International Telecommunication Union (ITU) has promulgated standards to facilitate wireless communications. This includes TIA-856, which is also known as evolution-data optimized (EVDO). The European Telecommunications Standards Institute (ETSI) has also promulgated a standard known a long term evolution (LTE). All of these standards may include specifications for various aspects of wireless communication with a network. This includes processes for registering on the network, carrier modulation, frequency bands of operation, and message formats. Recognizing that there is a market for wireless devices that communicate using these new standards, many companies are engaging in developing chipsets for these new wireless standards.

Overview

A method of determining wireless chipset performance is disclosed. A performance indicator for uplink traffic is measured a plurality of times under a plurality of conditions to generate a set of uplink performance indicators. The performance indicator for downlink traffic is measured a plurality of times under the plurality of conditions to generate a set of downlink performance indicators. The plurality of conditions comprise: a set of center frequency parameters; a set of attenuation factor parameters for each one of the set of center frequency parameters; a set of channel model parameters for each one of the combinations of attenuation factor parameters and center frequency parameters; and, a set of modulation coding scheme parameters for each one of the combinations of channel model parameters, attenuation factor parameters, and center frequency parameters.

A system for determining wireless chipset performance is disclosed. A test environment controller sets a plurality of conditions. A performance indicator monitor measures a performance indicator for uplink traffic a plurality of times under the plurality of conditions to generate a set of uplink performance indicators. The performance indicator monitor measures the performance indicator for downlink traffic a plurality of times under the plurality of conditions to generate a set of downlink performance indicators. The plurality of conditions comprise: a set of center frequency parameters; a set of attenuation factor parameters for each one of the set of center frequency parameters; a set of channel model parameters for each one of the combinations of attenuation factor parameters and center frequency parameters; and, a set of modulation coding scheme parameters for each one of the combinations of channel model parameters, attenuation factor parameters, and center frequency parameters.

A method of determining wireless chipset performance is disclosed. A base station emulator is provided with a set of center frequency parameters. For each one of the set of center frequency parameters, a channel emulator is provided with a set of attenuation factor parameters. For each one of the combinations of attenuation factor parameters and center frequency parameters, the channel emulator is provided with a set of channel model parameters.

For each one of the combinations of channel model parameters, attenuation factor parameters, and center frequency parameters, the base station emulator is provided with a set of uplink modulation coding scheme parameters. Uplink traffic is generated. An uplink performance indicator is measured.

For each one of the combinations of channel model parameters, attenuation factor parameters, and center frequency parameters, the base station emulator is provided with a set of downlink modulation coding scheme parameters. Downlink traffic is generated. A downlink performance indicator is measured.

For each one of the combinations of channel model parameters, attenuation factor parameters, and center frequency parameters, the base station emulator is provided with a set of bidirectional modulation coding scheme parameters. Bidirectional traffic is generated. A bidirectional performance indicator is measured.

BRIEF DESCRIPTION OF THE DRAWINGS

FIG. 6 is a block diagram of a computer system.

DETAILED DESCRIPTION

Figure 1:
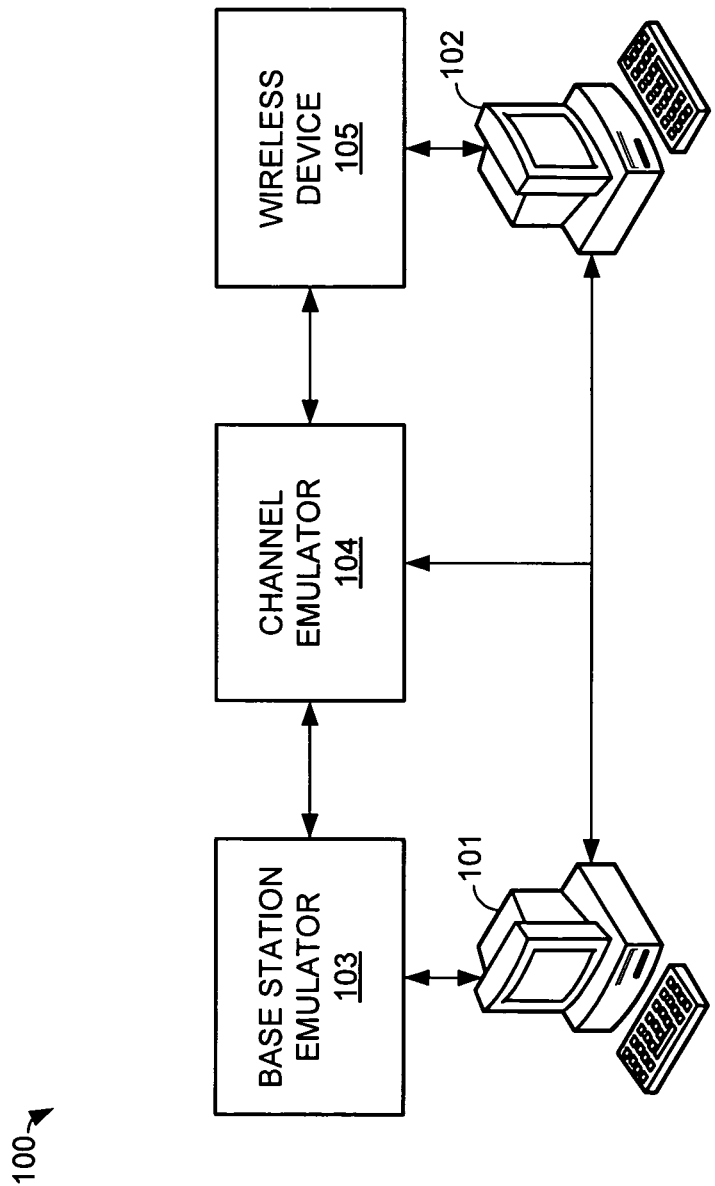
FIG. 1 is a block diagram illustrating a system for determining wireless chipset performance.

FIG. 1 is a block diagram illustrating a system for determining wireless chipset performance. Chipset evaluation system 100 comprises: computer system 101; base station emulator 103; channel emulator 104; wireless device 105; and computer system 102. Wireless device 105 includes a wireless chipset (not shown) being evaluated by chipset evaluation system 100. Computer system 101 is operatively coupled to base station emulator 103 and channel emulator 104. Base station emulator 103 is operatively coupled to channel emulator 104 via an RF link. Channel emulator 104 is operatively coupled to wireless device 105 via an RF link. These RF links may be wireless, or hardwired via a shielded cable. Wireless device 105 is operatively coupled to computer system 102. Computer system 101 is operatively coupled to computer system 102. Thus, computer system 101 and computer system 102 may exchange uplink (i.e., from wireless device 105 to base station emulator 103) traffic and downlink (i.e., from base station emulator 103 to wireless device 105) traffic via base station emulator 103, channel emulator 104, and wireless device 105.

Base station emulator 103 is a base station simulator that provides a controlled bidirectional RF link that simulates the actual operation of a base station. Base station emulator 103 provides real-time base station emulation including network entry, data connection, data transfer, and data protocol. Thus, for example, base station emulator 103 may emulate the functionality and RF characteristics of a WiMAX base station communicating over the air. Base station emulator 103 is controlled and/or configured by computer system 101.

Base station emulator 103 may be controlled or configured to emulate a base station operating in a variety of modes. These modes are determined by sets of parameters. These parameters include a set of parameters that determine at least the modulation coding scheme, traffic direction, frequency, and channel bandwidth of operation for base station emulator 103. These parameters may be divided into at least two groups of parameters: center frequency parameters and modulation coding scheme parameters. The center frequency parameters determine at least the center frequency and channel bandwidth of operation. The modulation coding scheme parameters determine at least the type of modulation and the coding scheme.

In an embodiment, the center frequency parameters that base station emulator 103 may be controlled by computer system 101 to use are in the broadband radio service (BRS) band from 2.496 GHz to 2.69 GHz. In an embodiment, base station emulator 103 may be controlled by computer system 101 to use a set of center frequencies as specified by the center frequency parameters that include one or more of: 2508.5 MHz; 2518.5 MHz; 2525 MHz; 2528.5 MHz; 2535 MHz; 2541.5 MHz; 2545 MHz; 2551.5 MHz; 2561.5 MHz; 2630.5 MHz; 2640.5 MHz; 2647 MHz; 2650.5 MHz; 2657 MHz; 2663.5 MHz; 2667 MHz; 2673.5 MHz; and, 2683.5 MHz.

In an embodiment, the modulation coding scheme parameters that base station emulator 103 may be controlled by computer system 101 to use are modulation types that include quadrature phase shift keying (QPSK) and quadrature amplitude modulation (QAM). In an embodiment, base station emulator 103 may be controlled by computer system 101 to use a set of modulation coding scheme parameters as specified by the WiMAX specifications. In an embodiment, the set of modulation coding scheme parameters may include one or more of: QPSK ½; QPSK ¾; 16QAM ½; 16QAM ¾; 64QAM ½; 64QAM ⅔; 64QAM ¾; and, 64QAM ⅚.

Channel emulator 104 exchanges RF signals with base station emulator 103 and wireless device 105. These signals are processed by channel emulator 104 to simulate over the air conditions and interference such as those caused by attenuation (e.g., distance), correlation, fading, or multipath.

Channel emulator 104 may be controlled to emulate over the air conditions determined by sets of parameters. These parameters may be divided into at least two groups of parameters: attenuation factor parameters and channel model parameters. The attenuation factor parameters determine at least the amount signals will be attenuated. The channel model parameters determine other ways that signals will be processed to simulate over the air conditions.

In an embodiment, channel emulator 104 may be controlled by computer system 101 to attenuate the signals exchanged between base station emulator 102 and wireless device 105 by at least one or more of: −45 dBm; −60 dBm; −75 dBm; −85 dBm; and −90 dBm. In an embodiment, channel emulator 104 may be controlled by computer system 101 to simulate over the air conditions specified by models that include one or more channel fading models of: ITU-1225 models A and B. In an embodiment, channel emulator 104 may be controlled by computer system 101 to simulate over the air conditions specified by channel fading models that include one or more of: AWGN (additive white Gaussian Noice); PED-B 3 km/hr; Veh-A 30 km/hr; Veh-A 60 km/hr; Veh-A 90 km/hr; and, Veh-A 120 km/hr.

Computer system 101 may act as a test environment controller in order to control base station emulator 103, channel emulator 104, wireless device 105, and computer system 102 to set a plurality of conditions. These conditions are determined and set by at least the center frequency parameters, modulation coding scheme parameters, attenuation factor parameters, and channel model parameters. Other parameters such as test duration, traffic direction, data rate, and traffic protocol may be set by computer system 101.

Computer system 101 may generate traffic to flow from computer system 101 to computer system 102 via base station emulator 103, channel emulator 104, and wireless device 105. Computer system 101 may control computer system 102 to generate traffic to flow from computer system 102 to computer system 101 via wireless device 105, channel emulator 104, and base station 103. Computer system 101 may generate traffic and control computer system 102 to generate traffic at the same time so that bidirectional traffic flows between computer system 101 and computer system 102 via base station emulator 103, channel emulator 104, and wireless device 105.

Computer system 101 or computer system 102 may generate traffic to flow between computer system 101 and computer system 102 using network performance monitoring software. On such example is Iperf. Iperf is a tool that can measure maximum internet protocol (e.g., TCP and UDP) throughputs. Iperf also allows the tuning of various parameters and UDP characteristics. Iperf reports throughputs, delay, jitter, and datagram loss.

While traffic is flowing between computer system 101 and computer system 102, computer system 101 or computer system 102 may act as a performance indicator monitor to monitor one or more performance indicators. These performance indicators may be one or more of bandwidth (a.k.a. channel throughput), delay, jitter, and datagram loss as reported by network monitoring software. Other devices may also act as performance indicator monitors to make measurements of other performance indicators. For example the power consumption or heat dissipation of wireless device 105 may be measured.

The plurality of conditions that computer 101 sets as a test environment controller may step through all the combinations of the four sets of center frequency parameters, modulation coding scheme parameters, attenuation factor parameters, and channel model parameters. For example, computer system 101 may control base station emulator 103 to step through each one of a set of center frequency parameters. In addition, for each one of the center frequency parameters, computer system 101 may control channel emulator 104 to step through a set of attenuation factor parameters. In addition, for each one of the combinations of attenuation factor parameters and center frequency parameters, computer system 101 may control channel emulator 104 to step through a set of channel model parameters. In addition, for each one of the combinations of channel model parameters, attenuation factor parameters, and center frequency parameters, computer system 101 may control base station emulator 103 to step through a set of modulation coding scheme parameters. The modulation coding scheme parameters may include one or more of a set of uplink modulation coding scheme parameters, a set of downlink modulation coding scheme parameters, and a set of bidirectional coding scheme parameters.

Computer system 101 may control computer system 102 to generate traffic. Computer system 101 may then measure at least one performance indicator for each of the plurality of conditions to generate a set of uplink performance indicators. Computer system 101 may generate traffic and control computer system 102 to measure at least one performance indicator for each of the plurality of conditions to generate a set of downlink performance indicators. Computer system 101 may generate traffic, and control computer system 102 to generate traffic at the same time. Computer system 101 and computer system 102 may then both measure at least one performance indicator for each of the plurality of conditions to generate a set of bidirectional performance indicators.

The sets of uplink, downlink, and bidirectional performance indicators may then be viewed or analyzed to determine the performance of the wireless chipset included in wireless device 105. For example, sets of uplink, downlink, and bidirectional performance indicators may be sorted to determine the minimum and maximum throughput, delay, jitter, packet loss, and power consumption of wireless device 105 under the plurality of conditions.

Figure 2:
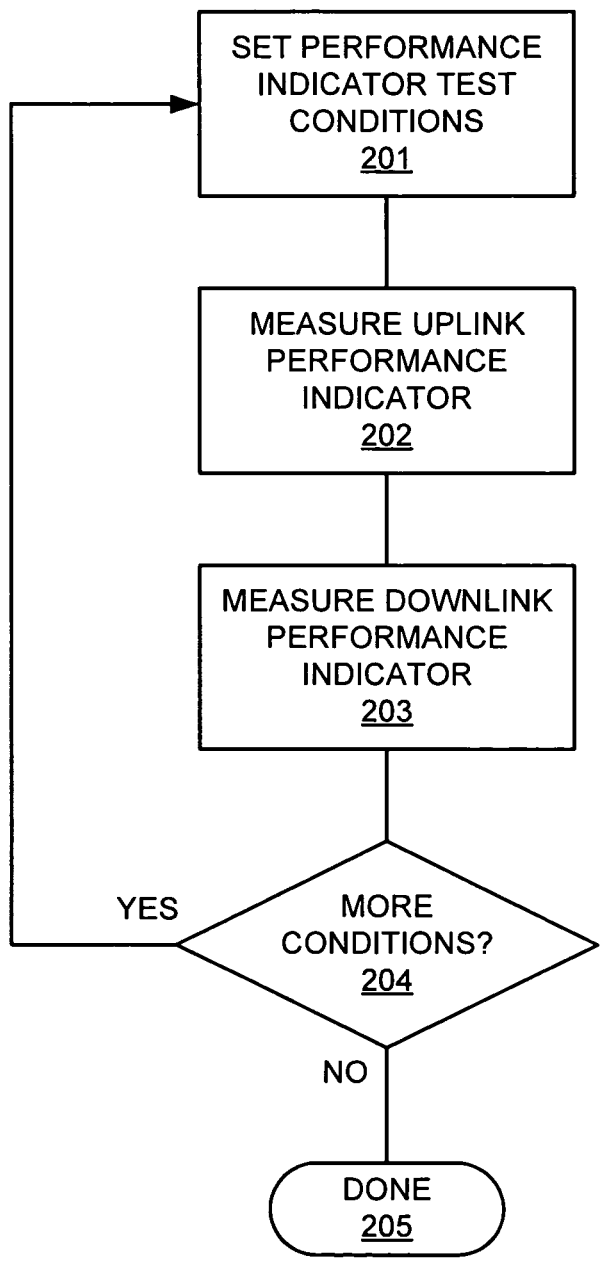
FIG. 2 is a flowchart illustrating a method of determining wireless chipset performance.

FIG. 2 is a flowchart illustrating a method of determining wireless chipset performance. The steps illustrated in FIG. 2 may be performed by chipset evaluation system 100.

Conditions for a performance indicator test are set (201). For example, computer system 101 may configure the elements of chipset evaluation system 100 into one of a plurality of conditions. This one of a plurality of conditions may include a combination made by taking one member from each of a set of center frequency parameters, a set of modulation coding scheme parameters, a set of attenuation factor parameters, and a set of channel model parameters.

An uplink performance indicator is measured (202). For example, computer system 101 may measure traffic throughput (in Mbits/S) as received by computer system 101 from computer system 102 via wireless device 105, channel emulator 104, and base station emulator 102.

A downlink performance indicator is measured (203). For example, computer system 102 may measure traffic throughput (in Mbits/S) as received by computer system 102 from computer system 101 via base station 102, channel emulator 104, and wireless device 105.

A test if performed to see if there are more conditions that have not had uplink and downlink performance indicators measured (204). If there are, then the flow proceeds back to block 201 so new conditions for a performance indicator test may be set. If there are no more untested conditions, then the process is done (205).

Figure 3:
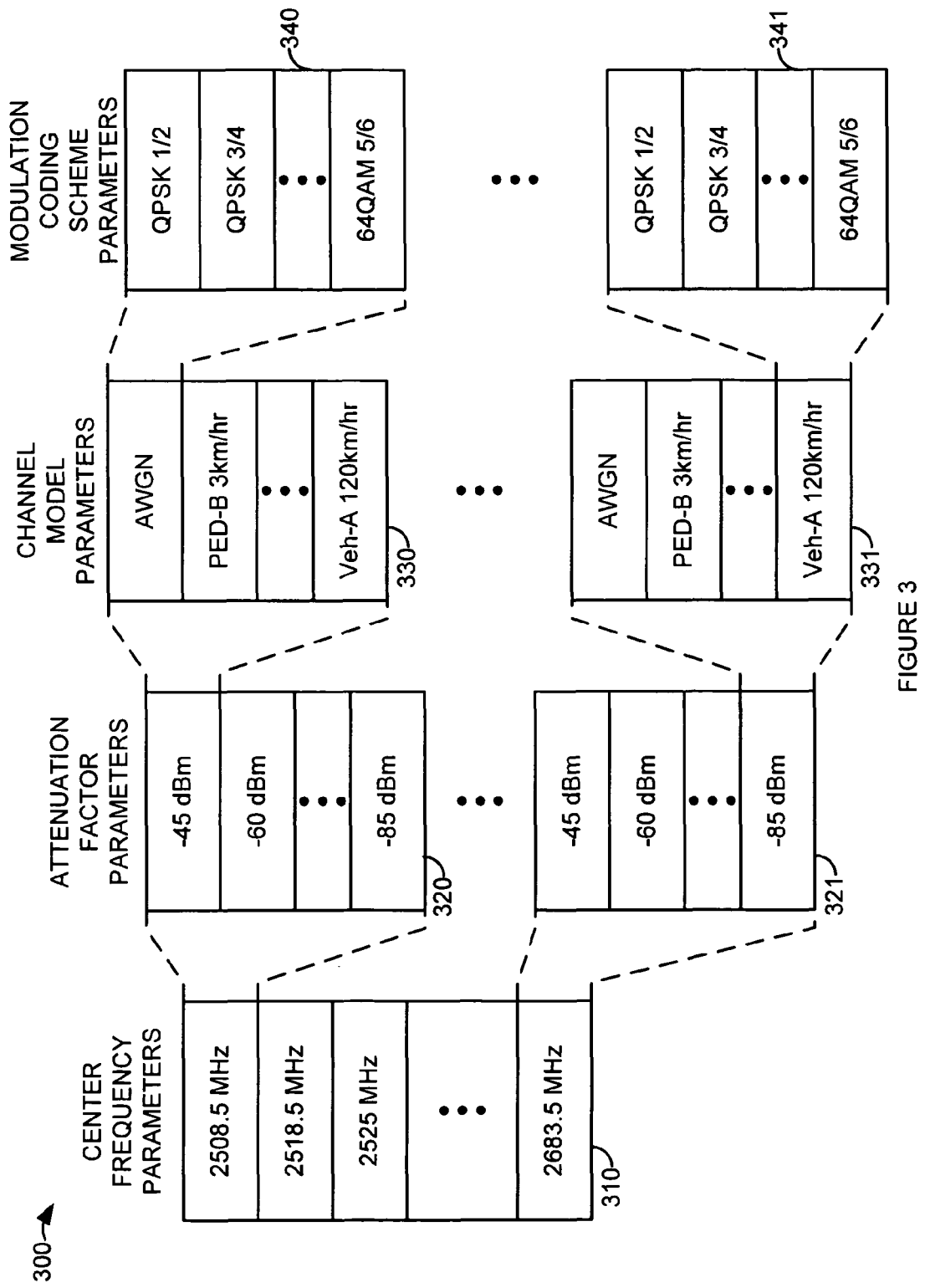
FIG. 3 illustrates a plurality of conditions.

FIG. 3 illustrates a plurality of conditions 300. Each member of a set of center frequency parameters 310, is combined with a set of attenuation factor parameters 320-321. Each member of the combination of center frequency parameters in the set of center frequency parameters 310 and the sets of attenuation factor parameters 320-321 is combined with a set of channel model parameters 330-331. Each member of the combination of center frequency parameters in the set of center frequency parameters 310, the sets of attenuation factor parameters 320-321, and the sets of channel model parameters 330-331 is combined with a set of modulation coding scheme parameters 340-341. These combinations form a plurality of conditions 300.

Figure 4:
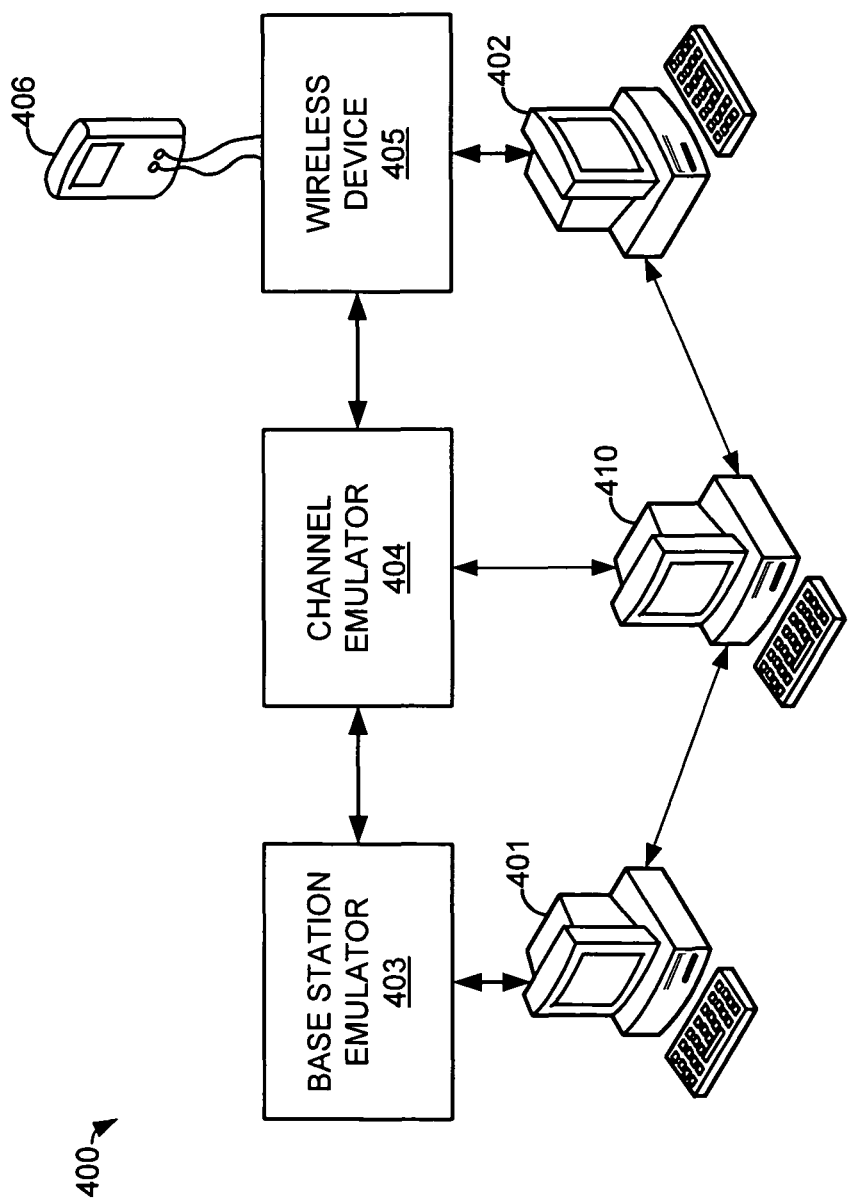
FIG. 4 is a block diagram illustrating a system for determining wireless chipset performance.

FIG. 4 is a block diagram illustrating a system for determining wireless chipset performance. Chipset evaluation system 400 comprises: computer system 401; base station emulator 403; channel emulator 404; wireless device 405; computer system 402; control computer 410; and measuring instrument 406. Wireless device 405 includes a wireless chipset (not shown) being evaluated by chipset evaluation system 400. Control computer 410 is operatively coupled to computer system 401, computer system 402, base station emulator 403, channel emulator 404, wireless device 405, and measuring instrument 406.

Computer system 401 is operatively coupled to base station emulator 403. Base station emulator 403 is operatively coupled to channel emulator 404 via an RF link. Channel emulator 404 is operatively coupled to wireless device 405 via an RF link. These RF links may be wireless or hardwired via a shielded cable. Wireless device 405 is operatively coupled to computer system 402. Thus, computer system 401 and computer system 402 may exchange uplink (i.e., from wireless device 405 to base station emulator 403) traffic and downlink (i.e., from base station emulator 403 to wireless device 405) traffic via base station emulator 403, channel emulator 404, and wireless device 405.

Measuring instrument 406 is operatively coupled to wireless device 405. Thus measuring instrument 406 may measure one or more performance indicators. For example, measuring instrument 406 may measure the power consumption of wireless device 405. In another example, measuring instrument 406 may measure the power dissipation of wireless device 405. In another example, measuring instrument 406 may measure a temperature on, inside, or nearby wireless device 405.

Base station emulator 403 is a base station simulator that provides a controlled bidirectional RF link that simulates the actual operation of a base station. Base station emulator 403 provides real-time base station emulation including network entry, data connection, data transfer, and data protocol. Thus, for example, base station emulator 403 may emulate the functionality and RF characteristics of a WiMAX, EVDO, or long term evolution (LTE) base station communicating over the air. Base station emulator 403 is controlled and/or configured by control computer 410.

Base station emulator 403 may be controlled or configured by control computer 410 to emulate a base station operating in a variety of modes. These modes are determined by sets of parameters. These parameters include a set of parameters that determine at least the modulation coding scheme, traffic direction, frequency, and channel bandwidth of operation for base station emulator 403. These parameters may be divided into at least two groups of parameters: center frequency parameters and modulation coding scheme parameters. The center frequency parameters determine at least the center frequency and channel bandwidth of operation. The modulation coding scheme parameters determine at least the type of modulation and the coding scheme.

In an embodiment, the center frequency parameters that base station emulator 403 may be controlled by control computer 410 to use are in the BRS band described previously. In an embodiment, the modulation coding scheme parameters that base station emulator 403 may be controlled by control computer 410 to use modulation types that include QPSK and QAM. In an embodiment, base station emulator 403 may be controlled by control computer 410 to use a set of modulation coding scheme parameters as specified by the WiMAX specifications.

Channel emulator 404 exchanges RF signals with base station emulator 403 and wireless device 405. These signals are processed by channel emulator 404 to simulate over the air conditions and interference such as those caused by attenuation (e.g., distance), correlation, fading, or multipath.

Channel emulator 404 may be controlled emulate over the air conditions determined by sets of parameters. These parameters may be divided into at least two groups of parameters: attenuation factor parameters and channel model parameters. The attenuation factor parameters determine at least the amount signals will be attenuated. The channel model parameters determine other ways that signals will be processed to simulate over the air conditions.

Control computer 410 acts as a test environment controller in order to control base station emulator 403, channel emulator 404, wireless device 405, computer system 401, and computer system 402 to set a plurality of conditions. These conditions are determined and set by at least the center frequency parameters, modulation coding scheme parameters, attenuation factor parameters, and channel model parameters. Other parameters such as test duration, traffic direction, data rate, and traffic protocol may be set by control computer 410.

Control computer 410 may control computer system 401 to generate traffic to flow from computer system 401 to computer system 402 via base station emulator 403, channel emulator 404, and wireless device 405. Control computer 410 may control computer system 402 to generate traffic to flow from computer system 402 to computer system 401 via wireless device 405, channel emulator 404, and base station 403. Control computer 410 may control computer system 401 to generate traffic and control computer system 402 to generate traffic at the same time so that bidirectional traffic flows between computer system 401 and computer system 402 via base station emulator 403, channel emulator 404, and wireless device 405.

Computer system 401 or computer system 402 may generate traffic to flow between computer system 401 and computer system 402 using network performance monitoring software. On such example is Iperf. Iperf is a tool that can measure maximum internet protocol bandwidth. Iperf also allows the tuning of various parameters and UDP characteristics. Iperf reports bandwidth, delay, jitter, and datagram loss.

While traffic is flowing between computer system 401 and computer system 402, computer system 401 or computer system 402 may act as a performance indicator monitor to monitor one or more performance indicators. These performance indicators may be one or more of traffic throughput, delay, jitter, and datagram loss as reported by network monitoring software. Other devices, such as measuring instrument 406, may act as performance indicator monitor to make measurements of other performance indicators such as the power consumption or heat dissipation of wireless device 405.

The plurality of conditions that control computer 410 sets as a test environment controller may step through all the combinations of the four sets of center frequency parameters, modulation coding scheme parameters, attenuation factor parameters, and channel model parameters. For example, control computer 410 may control base station 403 emulator to step through each one of a set of center frequency parameters. In addition, for each one of the center frequency parameters, control computer 410 may control channel emulator 404 to step through a set of attenuation factor parameters. In addition, for each one of the combinations of attenuation factor parameters and center frequency parameters, control computer 410 may control channel emulator 404 to step through a set of channel model parameters. In addition, for each one of the combinations of channel model parameters, attenuation factor parameters, and center frequency parameters, control computer 410 may control base station emulator 403 to step through a set of modulation coding scheme parameters. The modulation coding scheme parameters may include one or more of a set of uplink modulation coding scheme parameters, a set of downlink modulation coding scheme parameters, and a set of bidirectional coding scheme parameters.

Control computer 410 may control computer system 102 to generate traffic. Computer system 401 may then measure at least one performance indicator for each of the plurality of conditions to generate a set of uplink performance indicators. Control computer 410 may control computer system 401 to generate traffic, and control computer system 102 to measure at least one performance indicator for each of the plurality of conditions to generate a set of downlink performance indicators. Control system 410 may control computer system 401 to generate traffic, and control computer system 402 to generate traffic at the same time. Computer system 401 and computer system 402 may then both measure at least one performance indicator for each of the plurality of conditions to generate a set of bidirectional performance indicators.

The sets of uplink, downlink, and bidirectional performance indicators may then be viewed or analyzed to determine the performance of the wireless chipset included in wireless device 405. For example, sets of uplink, downlink, and bidirectional performance indicators may be sorted to determine the minimum and maximum throughput of wireless device 405 under the plurality of conditions.

Figure 5:
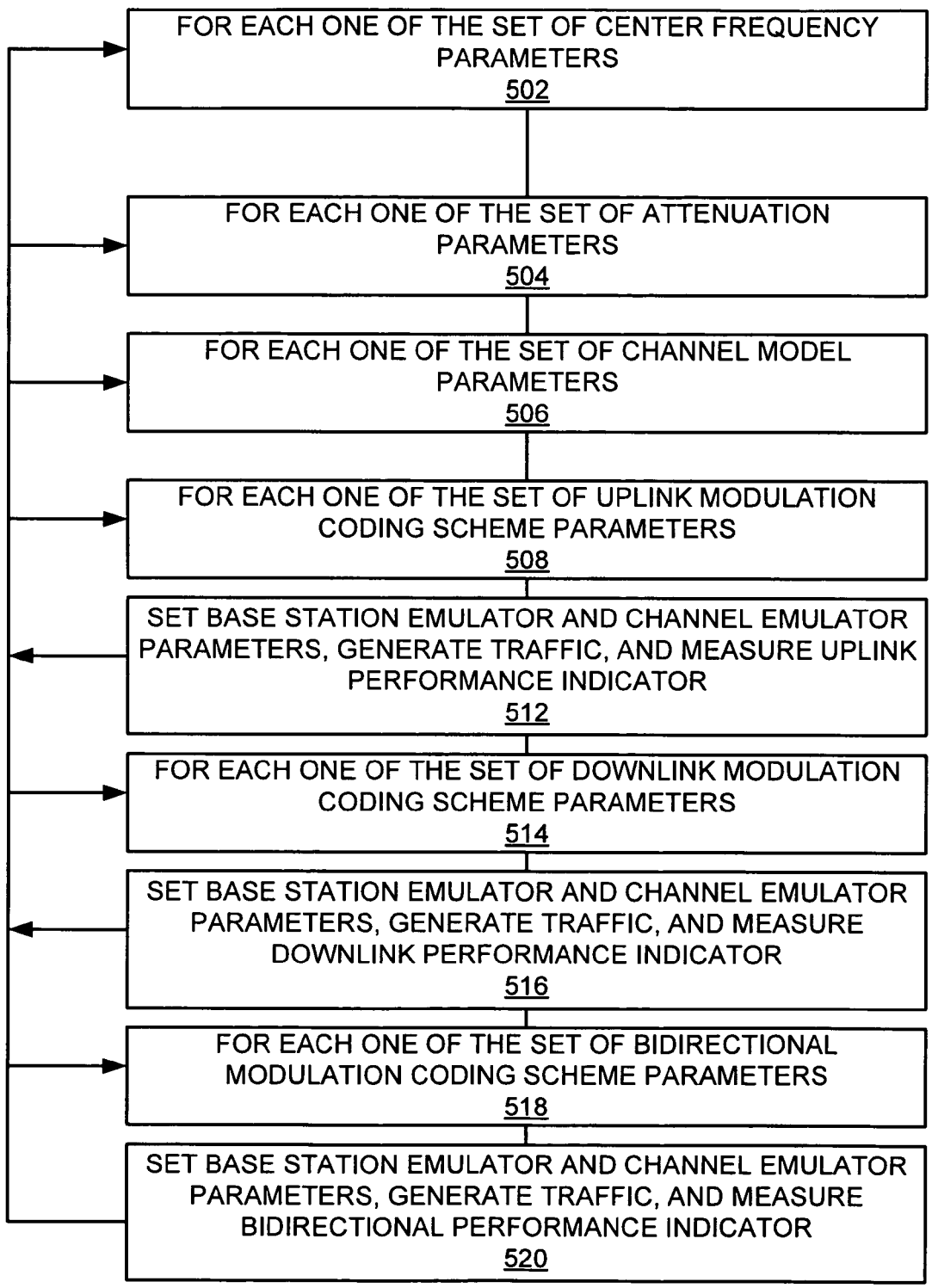
FIG. 5 is a flowchart illustrating a method of determining wireless chipset performance.

FIG. 5 is a flowchart illustrating a method of determining wireless chipset performance. The steps illustrated in FIG. 2 may be performed by chipset evaluation system 100 or chipset evaluation system 400.

For each one of the set of center frequency parameters, the flow proceeds to block 504 (502). For each one of the set of attenuation parameters, the flow proceeds to block 506 (504). For each one of the set of channel model parameters, the flow proceeds to block 508 (506). For each one of the set of uplink modulation coding scheme parameters, the flow proceeds to block 512 (508).

The base station emulator and channel emulator parameters are set. Traffic is generated and an uplink performance indicator is measured (512). For example, base station emulator 403 and channel emulator 404 may be set with center frequency parameters, attenuation parameters, channel model parameters, and uplink modulation coding scheme parameters as selected by blocks 502-508, respectively. Computer system 402 may generate traffic. Computer system 401 may then measure a performance indicator such as throughput or packet loss. The flow then proceeds back to block 508 as appropriate to select a new one of the set of uplink modulation coding scheme parameters that has not been tested. When all the uplink modulation coding scheme parameters have been tested, the flow proceeds to block 514.

For each one of the set of downlink modulation coding scheme parameters, the flow proceeds to block 516 (514). The base station emulator and channel emulator parameters are set. Traffic is generated and a downlink performance indicator is measured (516). For example, base station emulator 403 and channel emulator 404 may be set with center frequency parameters, attenuation parameters, channel model parameters, and downlink modulation coding scheme parameters selected by blocks 502-506 and 514, respectively. Computer system 401 may generate traffic. Computer system 402 may then measure a performance indicator such as throughput or packet loss. The flow then proceeds back to block 514 as appropriate to select a new one of the set of downlink modulation coding scheme parameters that has not been tested. When all the downlink modulation coding scheme parameters have been tested, the flow proceeds to block 518.

For each one of the set of bidirectional modulation coding scheme parameters, the flow proceeds to block 520 (518). The base station emulator and channel emulator parameters are set. Traffic is generated and a bidirectional performance indicator is measured (520). For example, base station emulator 403 and channel emulator 404 may be set with center frequency parameters, attenuation parameters, channel model parameters, and downlink modulation coding scheme parameters as selected by blocks 502-506 and 518, respectively. Computer system 401 and computer system 402 may both generate traffic at the same time. Computer system 401 and computer system 402 may then each measure a performance indicator such as throughput or packet loss. Flow then proceeds back to block 518 as appropriate to select a new one of the set of bidirectional modulation coding scheme parameters that has not been tested. When all the bidirectional modulation coding scheme parameters have been tested, the flow proceeds to back to the appropriate one of block 502-506.

The methods, systems, devices, computer systems, computers, emulators, and instruments described above may be implemented with, contain, or be executed by one or more computer systems. The methods described above may also be stored on a computer readable medium. Many of the elements of chipset evaluation system 100 and chipset evaluation system 400 may be, comprise, or include computers systems. This includes, but is not limited to: computer system 101; base station emulator 103; channel emulator 104; wireless device 105; computer system 102; computer system 401; base station emulator 403; channel emulator 404; wireless device 405; computer system 402; control computer 410; and measuring instrument 406.

FIG. 6 illustrates a block diagram of a computer system. Computer system 600 includes communication interface 620, processing system 630, and user interface 660. Processing system 630 includes storage system 640. Storage system 640 stores software 650. Processing system 630 is linked to communication interface 620 and user interface 660. Computer system 600 could be comprised of a programmed general-purpose computer, although those skilled in the art will appreciate that programmable or special purpose circuitry and equipment may be used. Computer system 600 may be distributed among multiple devices that together comprise elements 620-660.

Communication interface 620 could comprise a network interface, modem, port, transceiver, or some other communication device. Communication interface 620 may be distributed among multiple communication devices. Processing system 630 could comprise a computer microprocessor, logic circuit, or some other processing device. Processing system 630 may be distributed among multiple processing devices. User interface 660 could comprise a keyboard, mouse, voice recognition interface, microphone and speakers, graphical display, touch screen, or some other type of user device. User interface 660 may be distributed among multiple user devices. Storage system 640 may comprise a disk, tape, integrated circuit, server, or some other memory device. Storage system 640 may be distributed among multiple memory devices.

Processing system 630 retrieves and executes software 650 from storage system 640. Software 650 may comprise an operating system, utilities, drivers, networking software, and other software typically loaded onto a computer system. Software 650 may comprise an application program, firmware, or some other form of machine-readable processing instructions. When executed by processing system 630, software 650 directs processing system 630 to operate as described herein.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of determining wireless chipset performance, comprising:
measuring a performance indicator for uplink traffic sent to a wireless chipset of a wireless device a plurality of times under a plurality of conditions to generate a set of uplink performance indicators;
measuring a performance indicator for downlink traffic received from a wireless chipset of a wireless device a plurality of times under the plurality of conditions to generate a set of downlink performance indicators;
wherein the plurality of conditions comprise:
a set of center frequency parameters;
a set of attenuation factor parameters for each one of the set of center frequency parameters;
a set of channel model parameters for each one of the combinations of attenuation factor parameters and center frequency parameters, wherein the set of channel model parameters comprise at least one ITU channel fading model; and,
a set of modulation coding scheme parameters for each one of the combinations of channel model parameters, attenuation factor parameters, and center frequency parameters; and
determining a performance of the wireless chipset under the plurality of conditions based on the set of uplink performance indicators and the set of downlink performance indicators.

2. The method of claim 1, further comprising:
measuring the performance indicator for bidirectional traffic sent to and received from a wireless chipset of a wireless device a plurality of times under a second plurality of conditions to generate a set of bidirectional performance indicators;
wherein the second plurality of conditions comprise:
a set of center frequency parameters;
a set of attenuation factor parameters for each one of the set of center frequency parameters;
a set of channel model parameters for each one of the combinations of attenuation factor parameters and center frequency parameters;
a set of uplink modulation coding scheme parameters for each one of the combinations of channel model parameters, attenuation factor parameters, and center frequency parameters; and,
a set of downlink modulation coding scheme parameters for each one of the combinations of uplink modulation coding scheme parameters, channel model parameters, attenuation factor parameters, and center frequency parameters, and
determining a performance of the wireless chipset under the second plurality of conditions based on the set of bidirectional performance indicators.

3. The method of claim 1, wherein the performance indicator is based on traffic throughput.

4. The method of claim 1, wherein the performance indicator is based on the power consumed by the wireless chipset.

5. The method of claim 2, wherein the performance indicator is based on traffic throughput.

6. The method of claim 2, wherein the performance indicator is based on the power consumed by the wireless chipset.

7. The method of claim 1, further comprising:
controlling a base station emulator to set the set of center frequency parameters and the set of modulation coding scheme parameters.

8. The method of claim 1, further comprising:
controlling a channel emulator to set the set of attenuation factor parameters and the set of channel model parameters.

9. The method of claim 1, further comprising:
controlling a traffic generator to generate the uplink traffic and the downlink traffic.

10. A system for determining wireless chipset performance, comprising:
- a test environment controller that sets a plurality of conditions;
- a performance indicator monitor that measures a performance indicator for uplink traffic sent to a wireless chipset of a wireless device a plurality of times under the plurality of conditions to generate a set of uplink performance indicators and that measures a performance indicator for downlink traffic received from a wireless chipset of a wireless device a plurality of times under the plurality of conditions to generate a set of downlink performance indicators;
- wherein the plurality of conditions comprise:
  - a set of center frequency parameters;
  - a set of attenuation factor parameters for each one of the set of center frequency parameters;
  - a set of channel model parameters for each one of the combinations of attenuation factor parameters and center frequency parameters, wherein the set of channel model parameters comprise at least one ITU channel fading model; and,
  - a set of modulation coding scheme parameters for each one of the combinations of channel model parameters, attenuation factor parameters, and center frequency parameters; and
- determining a performance of the wireless chipset under the plurality of conditions based on the set of uplink performance indicators and the set of downlink performance indicators.

11. The system of claim 10, wherein the performance indicator monitor measures the performance indicator for bidirectional traffic sent to and received from a wireless chipset of a wireless device a plurality of times under a second plurality of conditions to generate a set of bidirectional performance indicators, wherein the second plurality of conditions comprise:
- a set of center frequency parameters;
- a set of attenuation factor parameters for each one of the set of center frequency parameters;
- a set of channel model parameters for each one of the combinations of attenuation factor parameters and center frequency parameters;
- a set of uplink modulation coding scheme parameters for each one of the combinations of channel model parameters, attenuation factor parameters, and center frequency parameters; and
- a set of downlink modulation coding scheme parameters for each one of the combinations of uplink modulation coding scheme parameters, channel model parameters, attenuation factor parameters, and center frequency parameters; and
- determining a performance of the wireless chipset under the plurality of conditions based on the set of bidirectional performance indicators.

12. The system of claim 10, wherein the set of center frequency parameters and the set of modulation coding scheme parameters are set by a bases station emulator.

13. The system of claim 10, wherein the set of attenuation factor parameters and the set of channel model parameters are set by a channel emulator.

14. The system of claim 10, wherein the uplink traffic and the downlink traffic are generated by a traffic generator.

15. The system of claim 10, wherein the performance indicator is based on traffic throughput.

16. The system of claim 10, wherein the performance indicator is based on the power consumed by the wireless chipset.

17. The system of claim 11, wherein the performance indicator is based on traffic throughput.

18. The system of claim 11, wherein the performance indicator is based on the power consumed by the wireless chipset.

19. A method of determining wireless chipset performance, comprising:
- providing a base station emulator with a set of center frequency parameters;
- for each one of the set of center frequency parameters, providing a channel emulator with a set of attenuation factor parameters;
- for each one of the combinations of attenuation factor parameters and center frequency parameters, providing the channel emulator with a set of channel model parameters, wherein the set of channel model parameters comprise at least one ITU channel fading model;
- for each one of the combinations of channel model parameters, attenuation factor parameters, and center frequency parameters, providing the base station emulator with a set of uplink modulation coding scheme parameters, generating uplink traffic, sending the uplink traffic from a wireless chipset of a wireless device to the channel emulator, and measuring an uplink performance indicator based on the uplink traffic;
- for each one of the combinations of channel model parameters, attenuation factor parameters, and center frequency parameters, providing the base station emulator with a set of downlink modulation coding scheme parameters, generating downlink traffic, sending the downlink traffic from the channel emulator to the wireless chipset of the wireless device, and measuring a downlink performance indicator based on the downlink traffic;
- for each one of the combinations of channel model parameters, attenuation factor parameters, and center frequency parameters, providing the base station emulator with a set of bidirectional modulation coding scheme parameters, generating bidirectional traffic, exchanging the bidirectional traffic between the channel emulator and the wireless chipset of the wireless device, and measuring a bidirectional performance indicator based on the bidirectional traffic; and
- determining a performance of the wireless chipset of the wireless device under the plurality of conditions based on the uplink performance indicator, the downlink performance indicator, and the bidirectional performance indicator.

* * * * *